United States Patent
Roethinger et al.

(10) Patent No.: US 11,658,363 B2
(45) Date of Patent: May 23, 2023

(54) BATTERY FOR AN AIRCRAFT

(71) Applicant: AIRBUS HELICOPTERS DEUTSCHLAND GMBH, Donauworth (DE)

(72) Inventors: Johannes Roethinger, Harburg (DE); Manuel Kempf, Donauworth (DE); Maximo Henares-Extremera, Augsburg (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 104 days.

(21) Appl. No.: 17/350,674

(22) Filed: Jun. 17, 2021

(65) Prior Publication Data
US 2022/0123409 A1   Apr. 21, 2022

(30) Foreign Application Priority Data
Oct. 15, 2020   (EP) .................................. 20400018

(51) Int. Cl.
*H01M 50/231*   (2021.01)
*H01M 50/249*   (2021.01)
(Continued)

(52) U.S. Cl.
CPC .......... *H01M 50/231* (2021.01); *B64D 41/00* (2013.01); *H01M 10/054* (2013.01); *H01M 10/0525* (2013.01); *H01M 50/213* (2021.01); *H01M 50/24* (2021.01); *H01M 50/249* (2021.01); *H01M 2220/20* (2013.01)

(58) Field of Classification Search
CPC ..................................................... B64D 41/00
See application file for complete search history.

(56) References Cited

U.S. PATENT DOCUMENTS

| 8,263,254 | B2 | 9/2012 | Mehta et al. |
| 8,361,642 | B2 | 1/2013 | Hermann et al. |

(Continued)

FOREIGN PATENT DOCUMENTS

| EP | 3460870 A1 | 3/2019 |
| JP | 2018098074 A * | 6/2018 |

(Continued)

OTHER PUBLICATIONS

Abstractor JP-2018098074-A. (Year: 2018).*

(Continued)

*Primary Examiner* — Gregg Cantelmo
(74) *Attorney, Agent, or Firm* — Brooks Kushman P.C.

(57) ABSTRACT

A battery for an aircraft. The present embodiments further relate to an aircraft with at least one such battery. The battery may include a battery casing with a casing wall that forms an interior volume, a plurality of battery cells that is arranged in the interior volume, and a functional layer that is arranged at the casing wall between the plurality of battery cells and the battery casing. The functional layer may include an intumescent material that, in case of a breach of the battery casing, is adapted to ensuring flame containment within the interior volume and mitigation of uncontrolled heat and gas emission from the interior volume through the breach of the battery casing.

20 Claims, 11 Drawing Sheets

(51) Int. Cl.
  *H01M 50/24* (2021.01)
  *H01M 50/213* (2021.01)
  *B64D 41/00* (2006.01)
  *H01M 10/0525* (2010.01)
  *H01M 10/054* (2010.01)

(56) References Cited

U.S. PATENT DOCUMENTS

| | | | |
|---|---|---|---|
| 9,136,558 B2 | 9/2015 | Peskar et al. | |
| 10,490,785 B1 * | 11/2019 | Simontacchi | H01M 50/24 |
| 2008/0318121 A1 * | 12/2008 | Takagi | H01M 50/213 429/120 |
| 2010/0075221 A1 * | 3/2010 | Mehta | H01M 50/116 429/178 |
| 2011/0064997 A1 | 3/2011 | Peskar et al. | |
| 2011/0300431 A1 | 12/2011 | Smith et al. | |
| 2012/0308859 A1 | 12/2012 | Hermann et al. | |
| 2015/0221914 A1 * | 8/2015 | Page | H01M 50/394 429/82 |
| 2016/0336627 A1 | 11/2016 | Syed et al. | |
| 2019/0207188 A1 * | 7/2019 | Miller | H01M 50/143 |

FOREIGN PATENT DOCUMENTS

| | | |
|---|---|---|
| WO | 1997045884 A2 | 12/1997 |
| WO | 2012166494 A1 | 12/2012 |
| WO | 2015113133 A1 | 8/2015 |

OTHER PUBLICATIONS

Gordon et al. Puncture Self-healing Polymers for Aerospace Applications. In: 242nd American Chemical Society National Meeting and Exposition, Aug. 28, 2011, Denver, CO United States. 2 pages.

Kalista, Jr et al. Effect of Ionic Content on Ballistic Self-Healing in EMAA Copolymers and Ionomers. In: Polymer Chemistry. Issue 18, Sep. 21, 2013, pp. 4823 to 5018.

Varley, R.J. and Van Der Zwaag, S. Towards an Understanding of Thermally Activated Self-Healing of an Ionomer System During Ballistic Penetration. In: Acta Materialia, vol. 56, Issue 19, Nov. 2008, pp. 5737 to 5750.

European Search Report for European Application No. EP 20400018.6, Completed by the European Patent Office, dated Mar. 23, 2021, 7 pages.

* cited by examiner

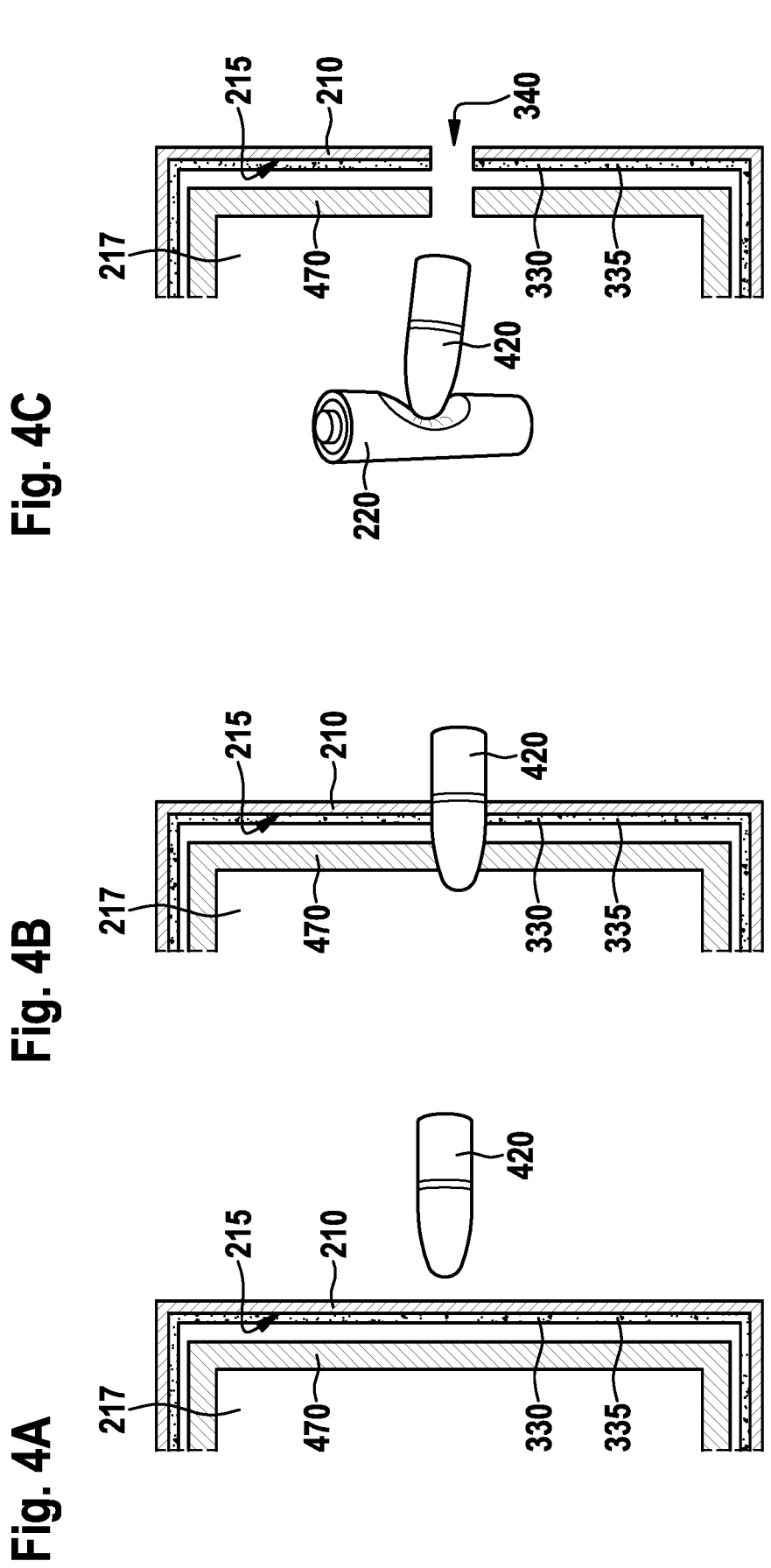

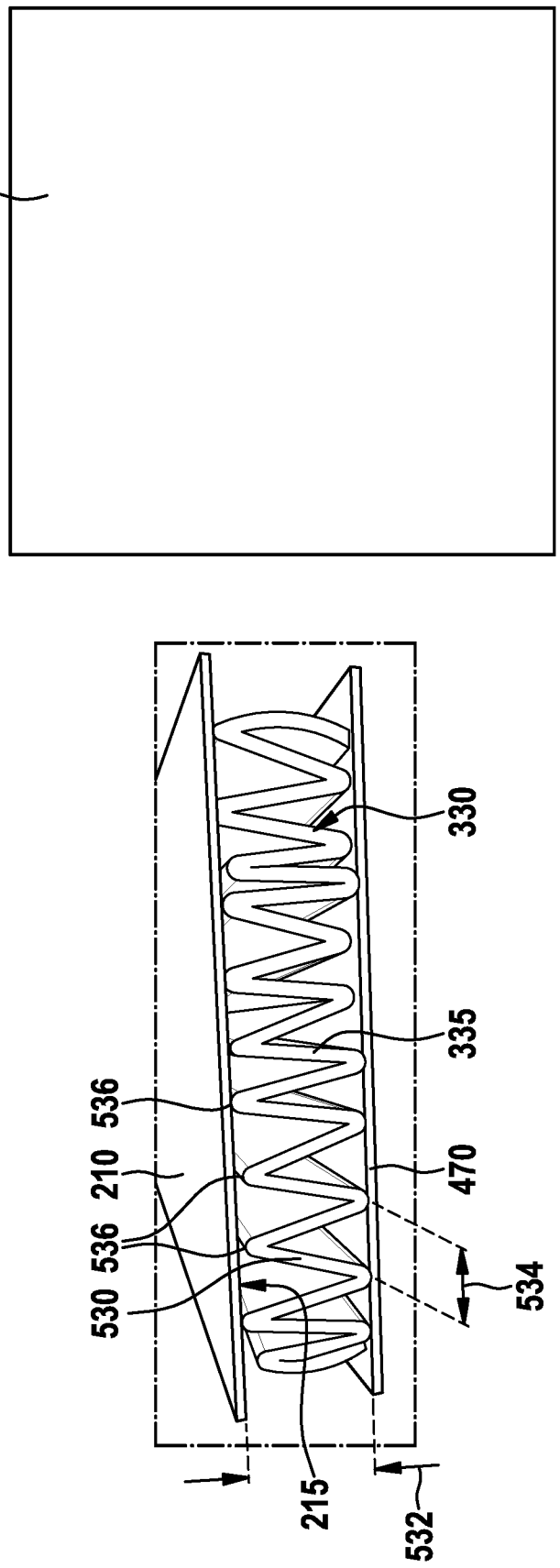

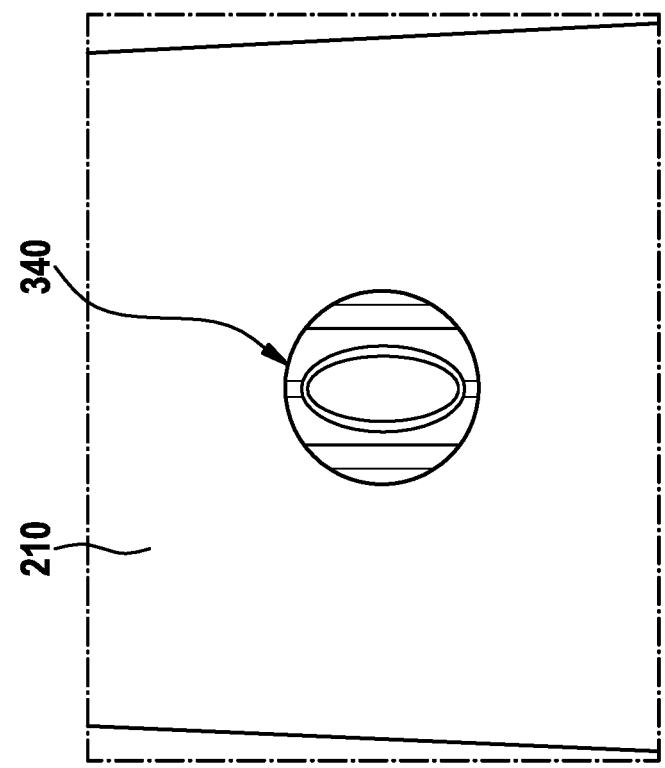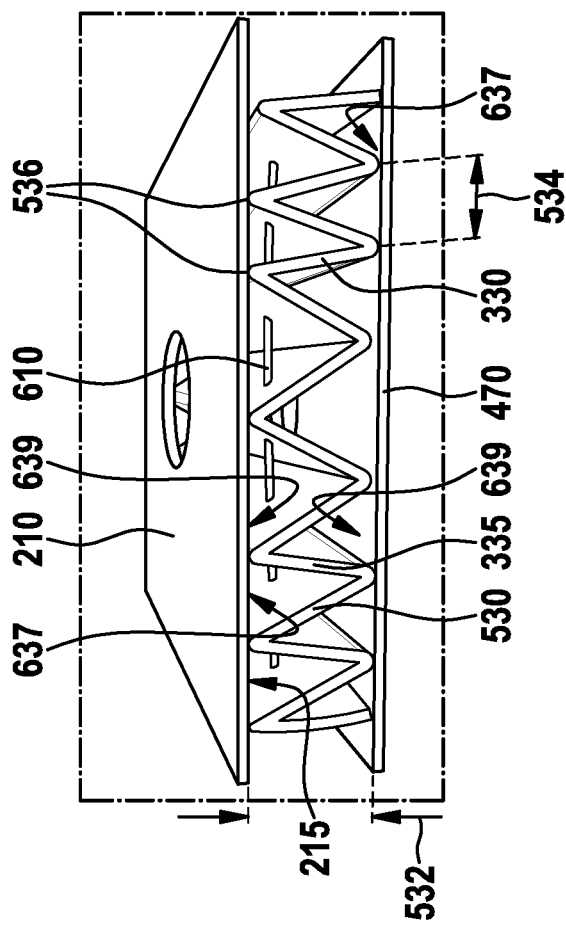

BATTERY FOR AN AIRCRAFT

CROSS-REFERENCE TO RELATED APPLICATIONS

This application claims priority to European patent application No. EP 20400018.6 filed on Oct. 15, 2020, the disclosure of which is incorporated in its entirety by reference herein.

TECHNICAL FIELD

The present embodiments relate to a battery for an aircraft, and, more particularly, to a battery for an aircraft that is adapted to limit the consequences of a breach of the battery's casing. The present embodiments further relate to an aircraft with at least one battery that is adapted to limit the consequences of a breach of the battery's casing.

BACKGROUND

Rechargeable and non-rechargeable lithium type batteries (i.e., lithium batteries and lithium-ion batteries) are currently used to some limited extent in aerospace applications. However, lithium type batteries are considered as the main technology for future electrification of aircrafts, in particular for high-energy and/or high-power applications.

The chemistry and technology that is used in rechargeable and non-rechargeable lithium type batteries have inherent risks. For instance, lithium type batteries use electrolytes, that are known to be flammable. In case of an internal or external failure, a self-sustaining increase in temperature and pressure, which is sometimes also referred to as a thermal runaway, may occur.

As a result, the battery casing, usually made of stainless steel, can be breached and toxic, hot, flammable, and/or corrosive fluids or gases including the flammable electrolyte and/or other material components of the lithium type battery may be released. Moreover, high temperatures and/or fire may be released from the battery casing. This is particularly hazardous when lithium type batteries are used in vehicles as surrounding vehicle structures or adjacent equipment may be damaged.

Currently, the negative effects of an internal failure of a battery are managed by the battery casing and a gas evacuation provision that vents hot gases overboard in a controlled manner. The gas evacuation provision may prevent an increase in pressure inside the battery casing, thereby preventing an explosion of the battery.

However, in some applications (e.g., in spacecraft or in military vehicles such as cars, trucks, tanks, aircraft, vessels, etc.) it may also be necessary to consider external impacts such as e.g., debris or ballistic impacts. These external impacts may breach the battery casing, damage the battery cells, and trigger internal battery failure. In such cases, an uncontained thermal runaway of the battery cells often occurs. Hot and/or flammable gases, heat and/or fire can neither be contained by the battery casing, nor can they be directed overboard in a controlled manner (e.g., through a gas evacuation venting tube).

As a result, the hot and/or flammable gases as well as the heat and/or fire are often released in an uncontrolled manner and potentially threaten the integrity of the surrounding structures and/or that of adjacent equipment. Such a threat is considered unacceptable and needs to be mitigated.

Some traditional mitigation techniques include the use of bullet-resistant and/or bulletproof armor protections around the battery that help to absorb and/or stop the penetration of external impacts caused by bullets or other ballistic threats. These bullet-resistant or bulletproof armor protections comprise many layers of woven or laminated fibers, or metal or ceramic plates. However, all these traditional mitigation techniques have the disadvantage of requiring a significant additional weight, which is unfavorable for some applications such as aerospace applications.

Traditional techniques that deal with the problem of a ballistic impact include the use of materials with self-healing and/or sealing properties. For example, a polymeric functional material such as ionomer may close a hole created by a ballistic impact.

Document WO 2012/166494 A1 describes a system with one or more self-sealing panels and a cap member. The one or more self-sealing panels substantially cover an exterior surface of a liquid container. The cap member covers at least one of the following: one or more portions of the exterior surface of the liquid container; and an exterior surface of at least one of the one or more self-sealing panels.

Similar solutions are described in GORDON et al. Puncture Self-healing Polymers for Aerospace Applications. In: 242nd American Chemical Society National Meeting and Exposition, 28 Aug. 2011, Denver, Colo. United States; KALISTA, Jr et al. Effect of Ionic Content on Ballistic Self-Healing in EMAA Copolymers and Ionomers. In: Polymer Chemistry. Issue 18, 21 Sep. 2013, pages 4823 to 5018; and VARLEY, R. J. and VAN DER ZWAAG, S. Towards an Understanding of Thermally Activated Self-Healing of an Ionomer System During Ballistic Penetration. In: Acta Materialia, Vol. 56, Issue 19, November 2008, pages 5737 to 5750.

However, the presented solutions based on the use of self-healing polymers have the disadvantage that the polymer, used for the self-sealing property, will degrade at temperatures occurring during a thermal runaway of a battery. As a result, the polymer will lose its functionality at high temperatures that typically occur during a thermal runaway of a battery.

In some systems directly related to batteries, the self-sealing material may be combined with multiple filler materials that assist the polymer to keep its functionality.

For example, the document US 2011/064997 A1 describes an impact resistant battery. The battery comprises a housing that includes a self-sealing ionomer material and that is filled with a material that suppresses flames and/or prevents the internal temperature from reaching an ignition point.

Similar solutions are described in document WO 1997/045884 A2 and document U.S. Pat. No. 9,136,558 B2.

However, in those solutions, the self-sealing property is still provided by the self-sealing ionomer alone. The fillers only act as flame retardant and/or to prevent the internal temperature from reaching an ignition point or as a mechanical stabilization.

Some of these solutions include the use of intumescent materials. Intumescent materials are typically used in construction as passive fire protection of structural steel as well as firestop to avoid fire propagation. The use of intumescent material with lithium batteries is also already known. For example, in electric cars, a layer of intumescent material may be used between the casing and the battery for mitigating the propagation of heat to others battery compartments and/or to the car structure.

Document WO 2015/113133 A1 describes a battery housing comprising a body and a lid, providing a chamber dimensioned to hold at least one battery, and a venting passageway from the chamber. A portion of the body and the housing comprises an intumescent material with an expansion ratio sufficient to drive gas from the chamber through the venting passageway and to seal the chamber, when the material intumesces in the event of thermal runaway of a battery housed in the chamber. The body and the lid, provide a plurality of battery chambers, each dimensioned to hold at least one battery, and a plurality of venting passageways, each venting passageway extending from one battery chamber of the plurality of battery chambers. A portion of the body and the lid comprises an intumescent flame-retardant material with an expansion ratio sufficient to drive gas from any given battery chamber of the plurality of battery chambers through at least one of the plurality of venting passageways, and seal the given battery chamber, when the material intumesces in the event of thermal runaway of a battery housed in the given battery chamber.

Similar solutions are described in document U.S. Pat. No. 8,263,254 B2, document US 2011/0300431 A1, document US 2016/0336627 A1, and document U.S. Pat. No. 8,361,642 B2.

However, these solutions are characterized by an intumescent material that is located around each battery cell of the battery in order to inactivate individual failed cells. Moreover, these documents only describe responses to an internal thermal runaway and does not describe solutions to mitigate a breach of the battery casing.

SUMMARY

It is, therefore, an objective to provide a new battery with a battery casing, whereby the new battery is adapted to mitigate the consequences of a breach of the battery casing. Furthermore, it is an objective to provide an aircraft having a new battery with a battery casing that is adapted to mitigate the consequences of a breach of the battery casing. This objective is solved by a battery comprising the features of claim 1.

More specifically, a battery for an aircraft may comprise a battery casing with a casing wall that forms an interior volume; a plurality of battery cells that is arranged in the interior volume; and a functional layer that is arranged at the casing wall between the plurality of battery cells and the battery casing, wherein the functional layer comprises an intumescent material that, in case of a breach of the battery casing, is adapted to ensuring flame containment within the interior volume and mitigation of uncontrolled heat and gas emission from the interior volume through the breach of the battery casing.

The functional layer may be provided in lithium-type batteries used in aircrafts such as airplanes, helicopters, or drones. The functional layer may not protect from a ballistic effect. In fact, a bullet may still penetrate the battery casing and damage the battery cells inside the battery casing.

However, the functional layer may restore the containment capabilities of the breached battery casing by creating a fireproof and thermally insulating barrier between the battery cells and the battery casing. Furthermore, the fireproof and thermally insulating barrier may close the bullet hole and prevent gases from leaking out of the battery casing in an uncontrolled manner. Thus, the functional layer adds fail-safe characteristics to the battery in a way that hazardous gases and fire are still contained inside the battery casing even though the actual battery casing is damaged.

In other words, the functional layer may close the bullet hole and force hot exhaust gases through a designed gas evacuation venting tube in a controlled manner during a thermal runaway of the damaged battery cells. Thereby, potential hazards of lithium-type batteries after a ballistic impact, including the uncontrolled release of flammable, toxic, corrosive gases and heat, etc. with effects on surrounding aircraft structures or adjacent equipment are mitigated.

As opposed to traditional ballistic protection concepts, the functional layer of the presented battery has relatively low weight, which is particularly beneficial for the use of such batteries on aircrafts, such as airplanes, helicopters, or drones. In contrast, traditional ballistic protection means such as bullet-resistant or bulletproof armor may weigh between 40 kg/m$^2$ and 45 kg/m$^2$, whereby all faces of the batteries need to be protected.

Furthermore, the installation of ballistic protection for the battery may be omitted. Thus, in addition to the ballistic protection, no integration devices such as fixation points, mountings, supporting frames, or brackets are required. Instead, the functional layer is integrated into the battery by the equipment manufacturer, resulting in reduced integration time, reduced weight, more available space, and reduced overall cost for the installation in the aircraft.

Moreover, the present battery uses a single functional layer to achieve thermal protection, fire proofing, and the ability of sealing a damaged battery casing.

According to another aspect, the above mentioned functionalities may be supported or further enhanced by a multilayer approach.

According to one aspect, the plurality of battery cells comprises at least one of lithium-ion type, sodium-ion type, or magnesium-ion type battery cells.

According to one aspect, the battery further comprises a gas evacuation venting tube that is adapted to enabling a controlled evacuation of gases in case of a thermal runaway of at least a portion of the plurality of battery cells.

According to one aspect, the battery further comprises a structural support layer that encloses the plurality of battery cells and separates the plurality of battery cells from the functional layer.

According to one aspect, the functional layer increases in volume upon intumescence of the intumescent material by at least a factor of 3.

According to one aspect, the functional layer further comprises a fibrous mat that comprises the intumescent material, wherein the fibrous mat remains evenly distributed in a predetermined arrangement between the structural support layer and the casing wall in case of an exposure to a temperature that is below a predetermined threshold, and wherein the fibrous mat is free to move between the structural support layer and the casing wall in case of an exposure to a temperature that is equal to or above the predetermined threshold.

According to one aspect, the fibrous mat comprises at least one of mineral wool, glass fibers, mineral fibers, alkaline earth silica fibers, carbon fibers, basalt fibers, binder, methylol melamine, phenol-formaldehyde resin, epoxy resin, pentaerythritol, monomer, dimer, trimer, starch, dextrin, sorbitol, mannitol, expandable graphite, exfoliating graphite, or char former polymer.

According to one aspect, the fibrous mat is at least partially shaped in a corrugated way with a predetermined height and a predetermined distance between parallel folding lines.

According to one aspect, the ratio between the predetermined height and the predetermined distance is between 0.5 and 5.

According to one aspect, the fibrous mat is superficially cut along the ridges of the parallel folding lines.

According to one aspect, the intumescent mat can be accumulated in one specific part of the battery housing.

According to one aspect, the functional layer further comprises stabilizing means for keeping the fibrous mat evenly distributed in the predetermined arrangement between the structural support layer and the casing wall in case of the exposure to the temperature that is below the predetermined threshold.

According to one aspect, the stabilizing means comprise at least one of pins, rods, or wires.

According to one aspect, the fibrous mat is threaded onto the at least one of pins, rods, or wires.

According to one aspect, the functional layer further comprises an additional intumescent material that forms a coating on the casing wall.

According to one aspect, the intumescent material can be triggered electrically by a resistive heating device.

According to one aspect, an additional intumescent coating can be applied on the (intumescent or not) fibrous mat to form the functional layer.

According to one aspect, an additional polymer coating can be applied on the intumescent fibrous mat to form the functional layer.

Moreover, an aircraft may comprise at least one battery as described above.

BRIEF DESCRIPTION OF THE DRAWINGS

Embodiments are outlined by way of example in the following description with reference to the attached drawings. In these attached drawings, identical or identically functioning components and elements are labeled with identical reference numbers and characters and are, consequently, only described once in the following description.

FIG. 4A is a diagram of an illustrative battery with a functional layer with an intumescent material between a battery casing that forms an interior volume and a structural support layer before a bullet impact in accordance with some embodiments, FIG. 4B is a diagram of the illustrative battery of FIG. 4A with the bullet hitting the battery casing in accordance with some embodiments, FIG. 4C is a diagram of the illustrative battery of FIG. 4B in which the bullet damages a battery cell in accordance with some embodiments, FIG. 5A is a diagram of an illustrative battery with a fibrous mat with an intumescent material before intumescence that is at least partially shaped in a corrugated way between a battery casing and a structural support layer in accordance with some embodiments, FIG. 5B is a diagram of the illustrative battery of FIG. 5A seen from above in accordance with some embodiments, FIG. 6A is a diagram of an illustrative fibrous mat with an intumescent material before intumescence that is at least partially shaped in a corrugated way between a battery casing and a structural support layer in accordance with some embodiments, FIG. 6B is a diagram of the illustrative fibrous mat of FIG. 6A with a hole in the fibrous mat and in the battery casing, seen from outside the battery in accordance with some embodiments.

DETAILED DESCRIPTION

Figure 1:
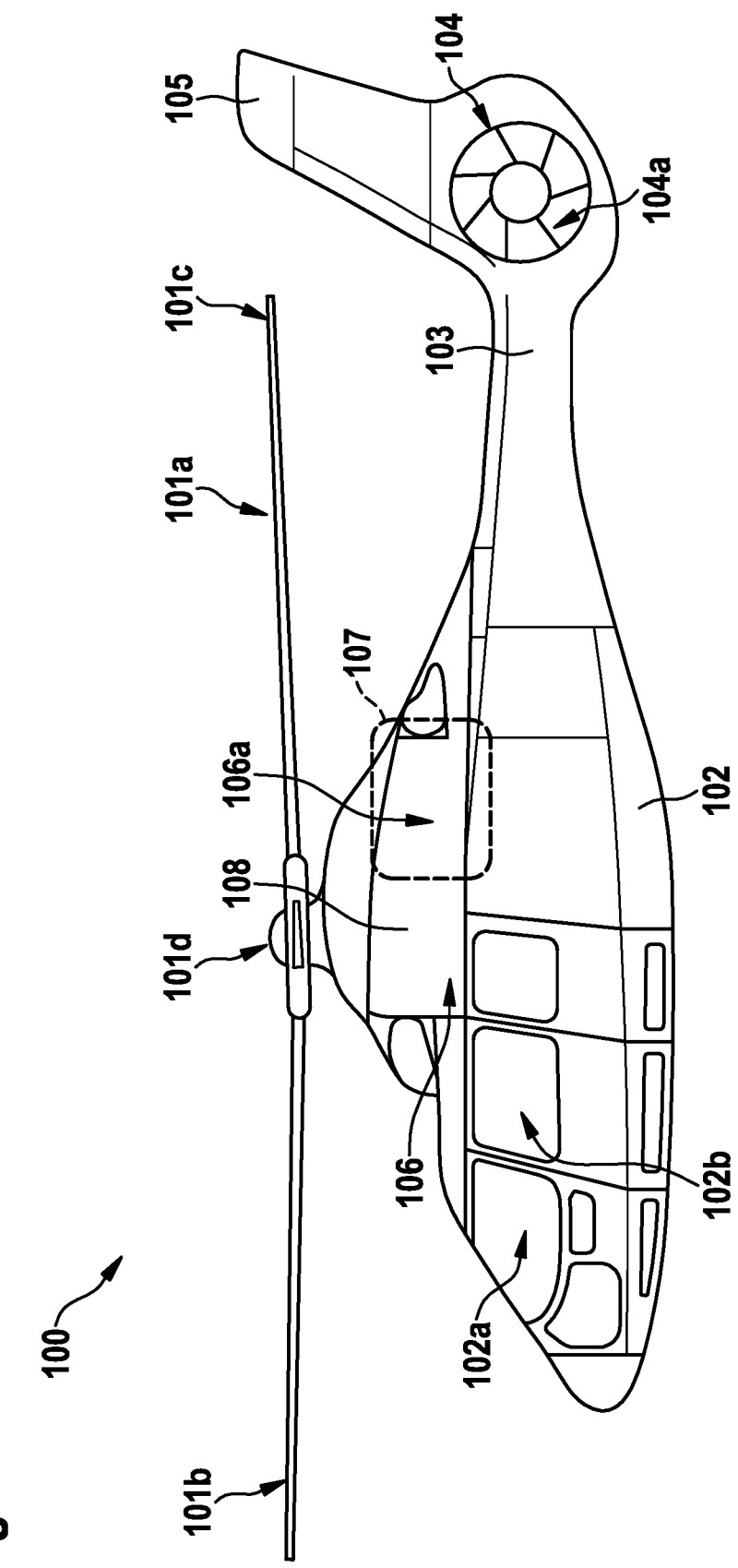
FIG. 1 shows a perspective view of an illustrative aircraft with at least one battery in accordance with some embodiments.

Embodiments may be included in transportation vehicles. FIG. 1 shows an example of a transportation vehicle. A transportation vehicle may be a spacecraft, an aircraft, a car, a bus, a truck, or a train, just to name a few. As shown in FIG. 1, the transportation vehicle may be an aircraft 100 that is exemplarily illustrated as a rotary-wing aircraft 100, and, more particularly, as a helicopter.

Thus, for purposes of simplicity and clarity, the rotary wing aircraft 100 is hereinafter referred to as the "helicopter 100". The present disclosure is, however, not limited to helicopters and can likewise be applied to any other vehicle, in particular to vehicles with at least one battery.

By way of example, the helicopter 100 comprises at least one multi-blade main rotor 101a for providing lift and forward or backward thrust during operation. The at least one multi-blade main rotor 101a preferentially comprises a plurality of rotor blades 101b, 101c that are mounted at an associated rotor head 101d to a rotor shaft, which rotates in operation of the helicopter 100 around an associated rotor axis.

The helicopter 100 illustratively further comprises a tail boom 103 and at least one preferentially shrouded counter-torque device 104 configured to provide counter-torque during operation, i.e., to counter the torque created by rotation of the at least one multi-blade main rotor 101a for purposes of balancing the helicopter 100 in terms of yaw.

The at least one counter-torque device 104 is illustratively provided at an aft section of the tail boom 103 and preferably comprises a tail rotor 104a. The aft section of the tail boom 103 preferably further comprises a fin 105.

Helicopter 100 may have an aircraft airframe 102. By way of example, the tail boom 103 may be connected to the fuselage 102 of the helicopter 100. The aircraft airframe 102 defines a supporting structure of helicopter 100 that is also referred to hereinafter as the fuselage 102 of the helicopter 100.

Illustratively, fuselage 102 forms an aircraft interior region 102a, 102b. The aircraft interior region 102a, 102b preferably accommodates at least a cockpit 102a and may further accommodate a cabin 102b.

Illustratively, the cabin 102b may be adapted for the transportation of passengers and/or cargo, so that the rotary-wing aircraft 100 as a whole is adapted for the transportation of passengers. If desired, the cabin 102b may be adapted for accommodating operational and electrical equipment, such as e.g., a battery.

It should be noted that exemplary configurations of the cabin 102b that are suitable for the transportation of passengers, but also for the accommodation of operational and electrical equipment, are readily available to the person skilled in the art and generally implemented to comply with applicable authority regulations and certification requirements regarding passenger transportation. Thus, these configurations of the cabin 102b are not described in detail for brevity and conciseness.

The helicopter 100 may include an aircraft upper deck 106 and that illustratively forms an engine accommodating region 107. Preferably, the aircraft upper deck 106 and, more particularly, at least the engine deck 106a is covered by a cowling 108 that is mounted on top of the fuselage 102.

Figure 2:
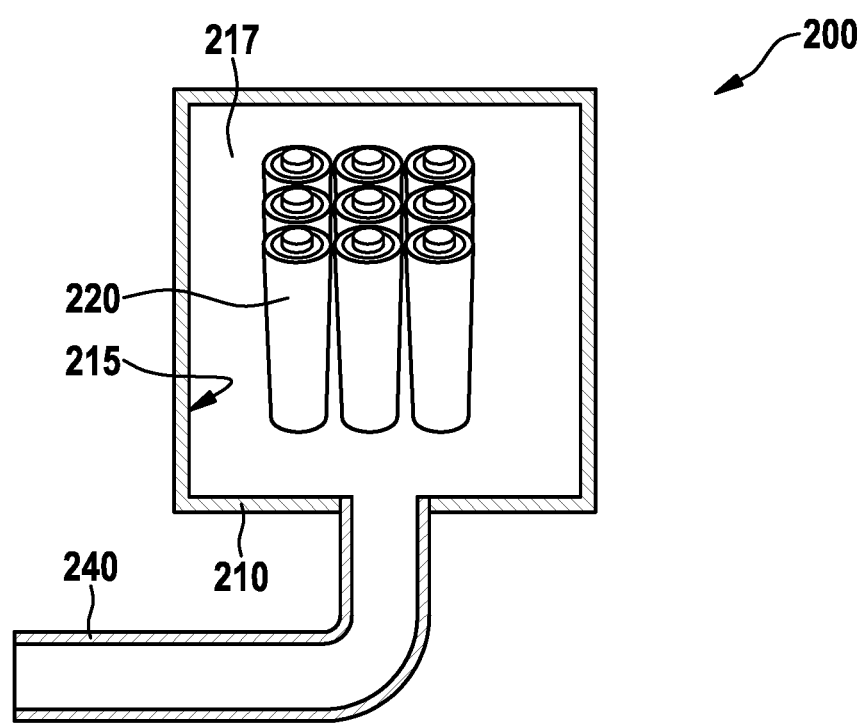
FIG. 2 is a diagram of an illustrative battery with a battery casing and a plurality of battery cells in accordance with some embodiments.

Illustratively, a battery may be installed in the engine accommodating region 107. If desired, the battery may be a battery as described in FIG. 2. FIG. 2 is a diagram of an illustrative battery 200 with a battery casing 210 and a plurality of battery cells 220 in accordance with some embodiments.

The battery casing 210 may comprise a casing wall 215 and form an interior volume 217. Illustratively, the plurality of battery cells 220 is arranged in the interior volume 217. If desired, the plurality of battery cells 220 may include at least one of lithium-ion type, sodium-ion type, or magnesium-ion type battery cells.

By way of example, the battery 200 may include a gas evacuation venting tube 240. The gas evacuation venting tube 240 may be adapted to enabling a controlled evacuation of gases, for example in case of a thermal runaway of at least a portion of the plurality of battery cells 220.

If desired, the battery 200 may include a functional layer. The functional layer may be arranged at the casing wall 215 between the plurality of battery cells 220 and the battery casing 210. Illustratively, the functional layer may include an intumescent material.

In case of a breach of the battery casing 210 (e.g., as the result of a ballistic impact), the intumescent material may be adapted to ensuring flame containment within the interior volume 217 and mitigation of uncontrolled heat and gas emission 352 from the interior volume 217 through the breach of the battery casing 220. For example, the intumescent material may intumesce into an expanded char that provides a thermal insulation between the plurality of battery cells 220 and the casing wall 215 and closes the breach of the battery casing 210.

Figure 3A:
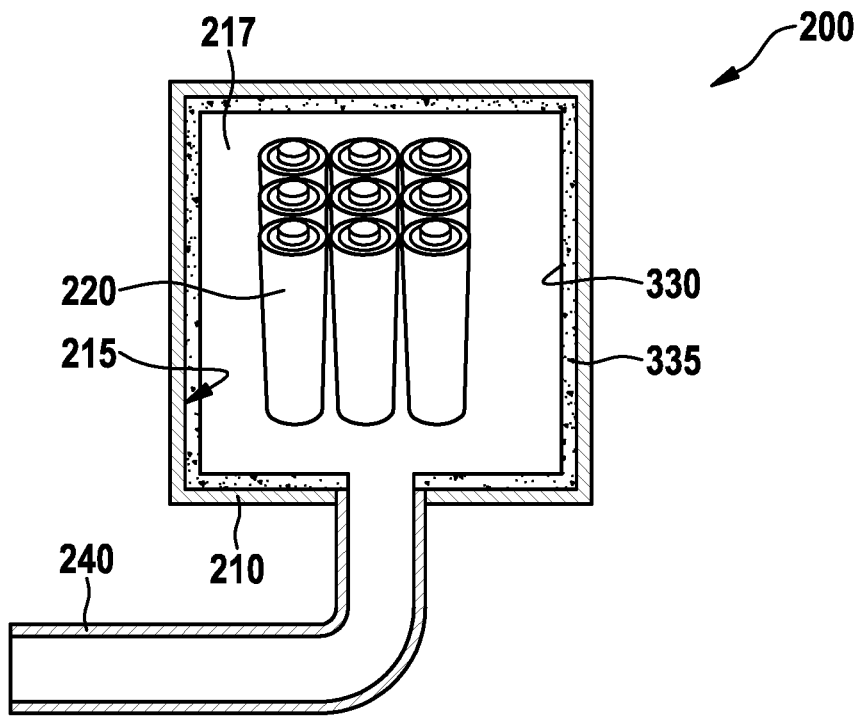
FIG. 3A is a diagram of an illustrative battery with battery cells, a battery casing, a functional layer, and a gas evacuation venting tube in accordance with some embodiments.

FIG. 3A is a diagram of an illustrative battery 200 with battery cells 220, a battery casing 210, a functional layer 330, and a gas evacuation venting tube 240 in accordance with some embodiments. Illustratively, the functional layer 330 may be arranged at the casing wall 215. For example, the functional layer 330 may cover the entire interior surface of the casing wall 215.

By way of example, the functional layer 330 may include an intumescent material 335. The intumescent material 335 may swell up and form an expanded char in case of an exposure to a temperature that is above a predetermined temperature threshold. For example, any fire inside the interior volume 217 may expose the intumescent material 335 to a temperature that is above the predetermined temperature threshold, thereby leading to the intumescence of the intumescent material 335.

For example, a damage event that breaches the battery casing 210 and damages one or more battery cells of the plurality of battery cells 220 may cause a thermal runaway of the one or more damaged battery cells that leads to a fire. Due to the fire, the intumescent material 335 may be exposed to a temperature above the predetermined temperature threshold and lead to the intumescence of the intumescent material 335.

Figure 3B:
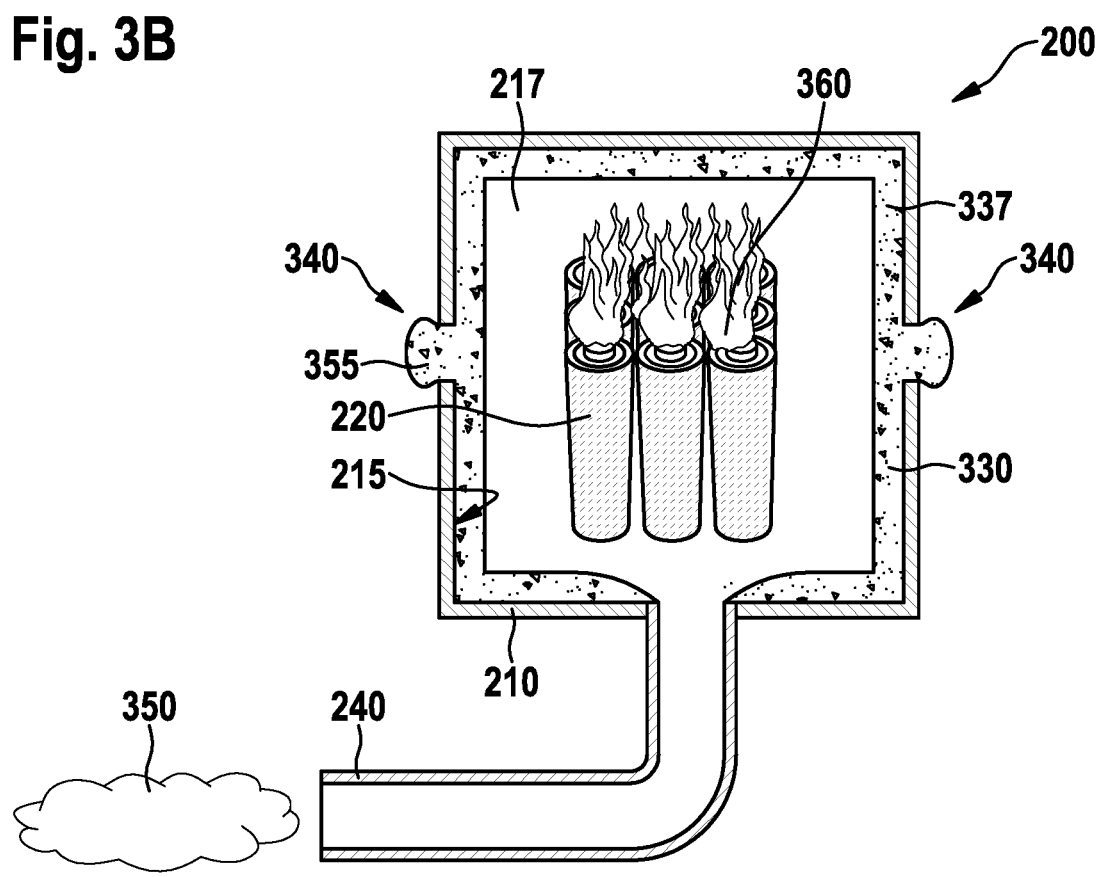
FIG. 3B is a diagram of the illustrative battery of FIG. 3A after a breach of the battery casing that is followed by a thermal runaway of the battery cells and a mitigation of the breach in accordance with some embodiments.

FIG. 3B is a diagram of the illustrative battery 200 of FIG. 3A after a breach 340 of the battery casing 210 that is followed by a thermal runaway of the battery cells 220 in accordance with some embodiments.

By way of example, any impact on the battery casing 210 may result in a breach 340 of the battery casing 210. As an example, the battery casing 210 may not move and be hit by flying debris, a bullet, shrapnel, or any other moving object. As another example, the battery casing 210 may move and hit other equipment, the floor, or any other non-moving object. As yet another example, the battery casing 210 may move and be hit by another moving object.

Consider the scenario in which a breach 340 of the battery casing 210 damages several battery cells of the plurality of battery cells 220. Consider further that the damaged battery cells experience a thermal runaway 360 that leads to a fire inside the interior volume 217 of the battery 200. In this scenario, the temperature inside the interior volume 217 may rise and lead to the intumescence of the intumescent material within functional layer 330, and thereby to the forming of an expanded char 337.

Illustratively, the functional layer 330 may increase in volume upon intumescence of the intumescent material by at least a factor of 2. Preferably, the functional layer 330 may increase in volume upon intumescence of the intumescent material by at least a factor of 3. In some embodiments, the functional layer 330 may increase in volume upon intumescence of the intumescent material by more than a factor of 4, The expanded char 337 from the intumescent material after intumescence may have a lower thermal conductivity than the intumescent material before intumescence.

The expanded char 337 may form a plug 355 that closes the breach 340. If desired, the functional layer 330 with the intumescent material after intumescence may form an airtight or gas flow or convection barrier at the breach 340. For example, the functional layer 330 may prevent flames and/or flammable gases from leaking through the breach 340.

Thus, the expanded char 337 (i.e., the intumescent material after intumescence) may be adapted to ensuring flame containment within the interior volume 217 and mitigation of uncontrolled heat and gas emission from the interior volume 217 through the breach 340 of the battery casing 210. If desired, heat and gases 350 may be released through the gas evacuation venting tube 240 that is adapted to enabling the controlled evacuation of gases 350.

Illustratively, a structural support layer may be provided. The structural support layer may assist with the arrangement of the functional layer 330 at the casing wall 215.

FIG. 4A is a diagram of an illustrative battery with a functional layer 330 in accordance with some embodiments. The functional layer 330 may include an intumescent material 335 and be arranged between a battery casing 210 that forms an interior volume 217 and a structural support layer 470. The illustrative battery is shown before being hit by a bullet 420.

Illustratively, the structural support layer 470 may enclose a battery cell. If desired, the structural support layer 470 may enclose a plurality of battery cells. For example, the structural support layer 470 may separate the plurality of battery cells from the functional layer 330.

The functional layer 330 may include a fibrous mat that comprises the intumescent material 335. If desired, the functional layer 330 may include an additional intumescent material. The additional intumescent material may form a coating on the casing wall 215.

FIG. 4B is a diagram of the illustrative battery of FIG. 4A with the bullet 420 hitting the battery casing 210 in accordance with some embodiments. Upon impact on the battery casing 210, the bullet 420 may damage the casing wall 215, the functional layer 330, and the structural support layer 470.

The velocity and the caliber of the bullet 420 may enable the bullet 420 to puncture the casing wall 215, the functional layer 330, and the structural support layer 470, thereby forming a breach of the battery casing 210.

After traversing the casing wall 215, the functional layer 330, and the structural support layer 470, the bullet 420 may hit one or more of the plurality of battery cells inside the battery casing 210.

FIG. 4C is a diagram of the illustrative battery of FIG. 4B in which the bullet 420 reaches and damages a battery cell 220 in accordance with some embodiments.

The damaged battery cell 220 may become unstable. For example, the damaged battery cell 220 may experience a thermal runaway and/or leak and release flammable, toxic, and/or corrosive gases. In some scenarios, the damaged battery cell 220 may damage other battery cells 220 that were not damaged by the bullet.

Figure 4E:
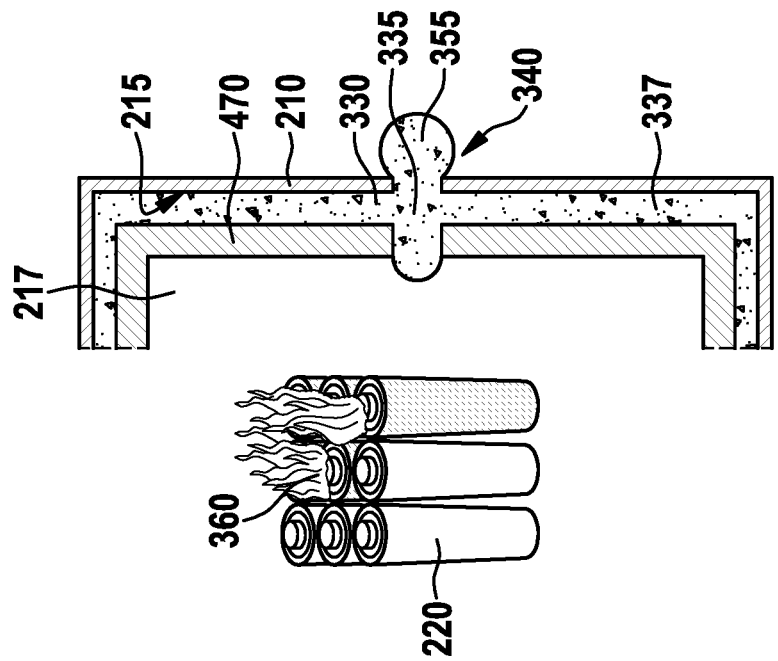
FIG. 4E is a diagram of the illustrative battery of FIG. 4D in which the functional layer increases in volume upon intumescence of the intumescent material, ensures flame containment within the interior volume, and mitigates uncontrolled heat release from the interior volume in accordance with some embodiments.
Figure 4D:
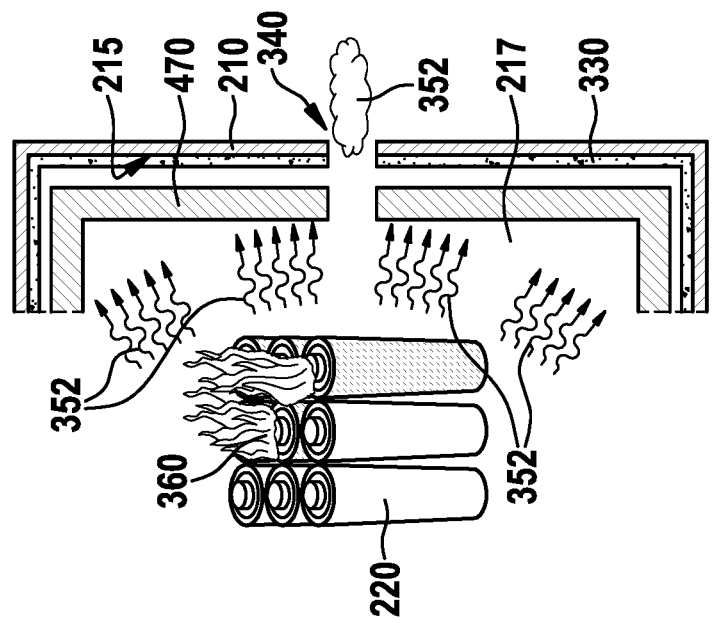
FIG. 4D is a diagram of the illustrative battery of FIG. 4C in which the damaged battery cell causes a fire with uncontrolled heat and gas emissions in accordance with some embodiments.

FIG. 4D is a diagram of the illustrative battery of FIG. 4C in which the damaged battery cell 220 experiences a thermal runaway 360 that causes a fire with uncontrolled heat and gas emissions 352. The fire may lead to an increase in temperature of the functional layer 330. As a result, the intumescent material 335 may intumesce.

FIG. 4E is a diagram of the illustrative battery of FIG. 4D in which the functional layer 330 increases in volume upon intumescence of the intumescent material 335. The expanded char 337 that results from the intumescence of the intumescent material 335 may fill the majority of space between the structural support layer 470 and the casing wall 215 of the battery casing 210.

Illustratively, the expanded char 337 may form a plug 355 that closes the breach 340 created by the bullet. Thereby, the expanded char 337 may ensure flame containment within the interior volume 217.

Preferably, the expanded char 337 (i.e., the intumescent material 335 after intumescence) may mitigate uncontrolled heat release from the interior volume 217. Thereby, the expanded char 337 may ensure the safety of the equipment that surrounds the battery.

The intumescent material 335 may be coated onto the casing wall 215 of the battery casing 210. Instead or in addition, a fibrous mat may include intumescent material.

FIG. 5A is a diagram of a battery with a functional layer 330 that includes an illustrative fibrous mat 530 with an intumescent material 335 before intumescence. The fibrous mat 530 may remain evenly distributed in a predetermined arrangement between the structural support layer 470 and the casing wall 215 of the battery casing 210 in case of an exposure to a temperature that is below a predetermined threshold.

For example, the fibrous mat 530 may remain evenly distributed in the predetermined arrangement between the structural support layer 470 and the casing wall 215 in case of an exposure to a temperature that is below the temperature that leads to the intumescence of the intumescent material 335.

Illustratively, the fibrous mat 530 may be free to move between the structural support layer 470 and the casing wall 215 in case of an exposure to a temperature that is equal to or above the predetermined threshold. For example, the fibrous mat 530 may be free to move between the structural support layer 470 and the casing wall 215 in case of an exposure to a temperature that is equal to or above the temperature that leads to the intumescence of the intumescent material 335.

Illustratively, the fibrous mat 530 may include at least one of mineral wool, glass fibers, mineral fibers, alkaline earth silica fibers, carbon fibers, basalt fibers, binder, methylol melamine, phenol-formaldehyde resin, epoxy resin, pentaerythritol, monomer, dimer, trimer, starch, dextrin, sorbitol, mannitol, expandable graphite, exfoliating graphite, or char former polymer.

As shown in FIG. 5A, the fibrous mat 530 may be at least partially shaped in a corrugated way with a predetermined height 532 and a predetermined distance 534 between parallel folding lines 536.

Illustratively, the wrinkles of the fibrous mat 530 may be oriented parallel to the direction from which a damaging event is expected to approach the battery casing 210. Thus, the wrinkles of the fibrous mat 530 may be parallel to the normal direction of the adjacent surface of the casing wall 215 of the battery casing 210.

If desired, the ratio between the predetermined height 532 and the predetermined distance 534 may be between 0.2 and 10. Preferably, the ratio between the predetermined height 532 and the predetermined distance 534 may be between 0.5 and 5.

As an example, the predetermined height 532 may be 25 mm and the predetermined distance 534 12.5 mm, resulting in a ratio of between the predetermined height 532 and the predetermined distance 534. As another example, the predetermined height 532 may be 25 mm and the predetermined distance 534 21.3 mm, resulting in a ratio of approximately 1.17 between the predetermined height 532 and the predetermined distance 534.

Illustratively, the fibrous mat 530 may be superficially cut along the ridges of the parallel folding lines 536. For example, the fibrous mat 530 may be superficially cut along the ridges of the parallel folding lines 536 to ease folding of the fibrous mat 530 and/or to reduce the spring effect of the folded fibrous mat 530.

Figure 5E:
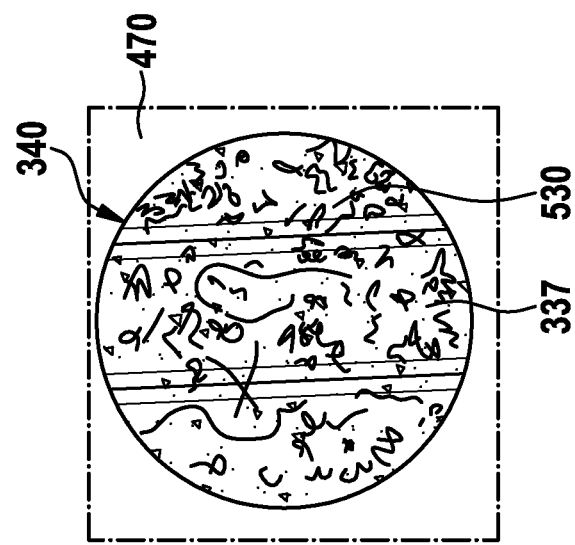
FIG. 5E is a diagram of the illustrative fibrous mat of FIG. 5C after traversal of the bullet and ensuing intumescence of the intumescent material seen from the side of the structural support layer in accordance with some embodiments.
Figure 5D:
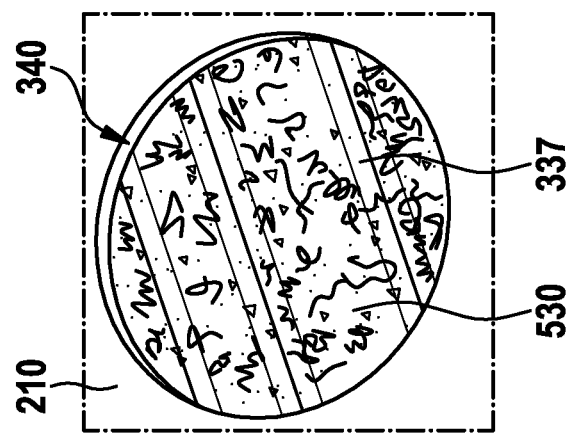
FIG. 5D is a diagram of the illustrative fibrous mat of FIG. 5C after traversal of the bullet and ensuing intumescence of the intumescent material seen from the side of the battery casing in accordance with some embodiments.
Figure 5C:
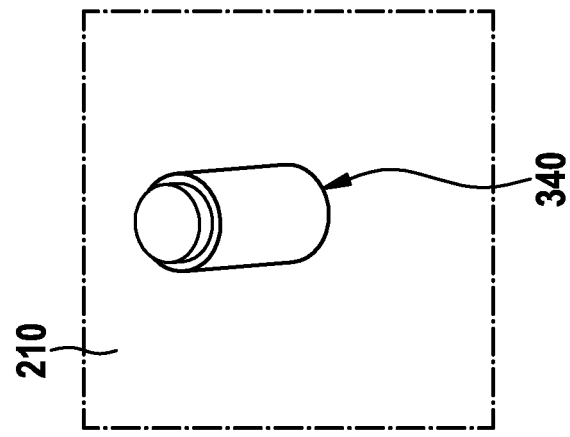
FIG. 5C is a diagram of the battery of FIG. 5B with a bullet traversing the battery casing in accordance with some embodiments.

FIG. 5B is a diagram of the illustrative battery casing of FIG. 5A seen from above, and FIG. 5C is a diagram of a bullet traversing both the fibrous mat 530 and the battery casing 210 of FIG. 5A in accordance with some embodiments.

The bullet may hit and damage one or more battery cells, which may lead to a fire inside the battery casing 210. As a result, the temperature inside the battery casing 210 may exceed the predetermined temperature threshold, above which the intumescent material 335 in the fibrous mat 530 intumesces.

Illustratively, the fibrous mat 530 may increase in volume between the structural support layer and the battery casing 210. The intumescent material 335 in the fibrous mat 530 may lead to the closure of the hole in the fibrous mat 530 caused by the bullet. Thereby, the intumescent material 335 in the fibrous mat 530 may ensure flame containment within the battery casing 210 and/or mitigation of uncontrolled heat and gas emission from the battery casing.

FIG. 5D is a diagram of the illustrative fibrous mat 530 of FIG. 5C after traversal of the bullet and ensuing intumescence of the intumescent material 335 seen from the side of the battery casing 210. FIG. 5E is a diagram of the illustrative fibrous mat 530 of FIG. 5C after traversal of the bullet and ensuing intumescence of the intumescent material 335 seen from the side of the structural support layer 470 in accordance with some embodiments.

As shown in FIG. 5D and FIG. 5E, the intumescent material 335 completely closes the hole in the fibrous mat 530 created by the bullet. Thus, intumescent material 335 may ensure flame containment within the interior volume. In addition, intumescent material 335 may mitigate uncontrolled heat release from the interior volume through the breach 340 of the battery casing 210.

FIG. 6A is a diagram of an illustrative fibrous mat 530 with an intumescent material 335 before intumescence that is at least partially shaped in a corrugated way. As shown in FIG. 6A, the arrangement of the fibrous mat 530 may be different than the arrangement of the fibrous mat 530 of FIG. 5A. The fibrous mat 530 may be arranged between a battery casing 210 and a structural support layer 470 in accordance with some embodiments.

Illustratively, the fibrous mat 530 is superficially cut along the ridges of the parallel folding lines 536. The superficial cuts along the ridges of the parallel folding lines 536 may ease folding of the fibrous mat 530 and/or reduce a spring effect.

If desired, the functional layer 330 may include stabilizing means 610. The stabilizing means 610 may keep the fibrous mat 530 evenly distributed in the predetermined arrangement between the structural support layer 470 and the casing wall 215 in case of the exposure to a temperature that is below a predetermined temperature threshold (i.e., before intumescence of the intumescent material 335).

Illustratively, the stabilizing means 610 may include at least one of pins, rods, or wires. If desired, the fibrous mat 530 is threaded onto the at least one of pins, rods, or wires.

By way of example, the functional layer 330 may include an additional intumescent material 637. The additional intumescent material 637 may form a coating 639 on the casing wall 215. If desired, the additional intumescent material 637 may form a coating 639 on the side of the structural support layer 470 that is oriented towards the casing wall instead. Illustratively, the additional intumescent material 637 may form a coating 639 on the casing wall 215 and on the side of the structural support layer 470 that is oriented towards the casing wall 215.

FIG. 6B is a diagram of the illustrative fibrous mat of FIG. 6A with a hole 340 in the casing wall and in the fibrous mat, seen from the outside of the battery through a hole in the battery casing 210 in accordance with some embodiments. The hole in the battery casing 210 may be caused by an impact of a projectile on the battery casing 210.

Consider the scenario in which the projectile damages a battery cell in the battery that causes a thermal runaway of the battery cell. In this scenario, the temperature inside the battery may rise above a predetermined temperature threshold at which the intumescent material 335 intumesces. As a result of the intumescence of the intumescent material 335, the functional layer 330 may increase in volume by at least a factor of 2, preferably by at least a factor of 3.

Figure 6E:
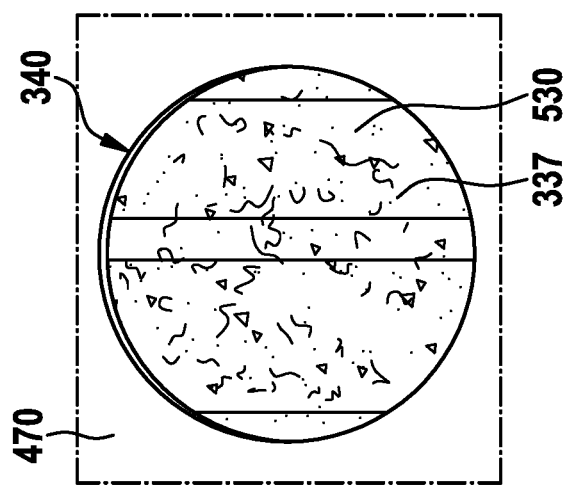
FIG. 6E is a diagram of the illustrative fibrous mat of FIG. 6B after intumescence of the intumescent material seen from the side of the structural support layer in accordance with some embodiments.
Figure 6D:
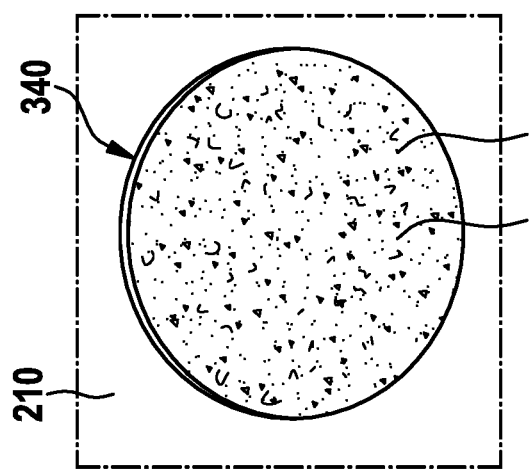
FIG. 6D is a diagram of the illustrative fibrous mat of FIG. 6B after intumescence of the intumescent material seen from the side of the battery casing in accordance with some embodiments.
Figure 6C:
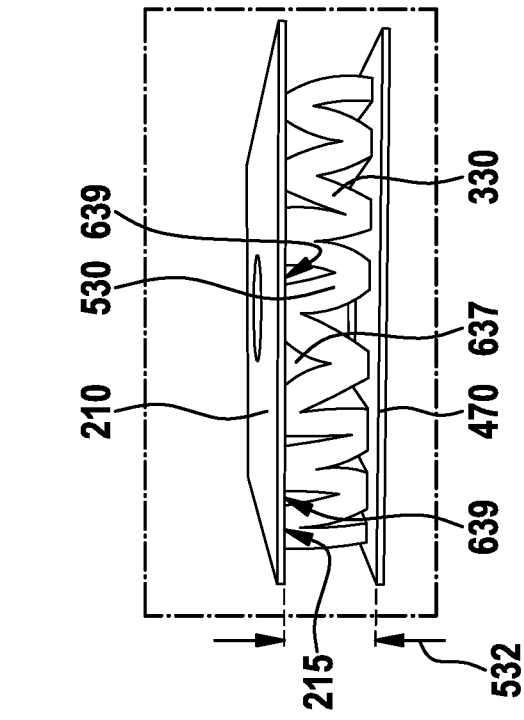
FIG. 6C is a diagram of the illustrative fibrous mat of FIG. 6A after intumescence of the intumescent material in accordance with some embodiments.

FIG. 6C is a diagram of the illustrative fibrous mat 530 of FIG. 6A after intumescence of the intumescent material 335. As shown in FIG. 6C, the stabilization means 610 allow free movement of the fibrous mat 530 upon intumescence of the intumescent material 335.

FIG. 6D shows the fibrous mat with the intumescent materials 337 and the additional intumescent material 637 after intumescence (i.e., in the form of expanded char) from the side of the battery casing 210, and FIG. 6E is a diagram of the illustrative fibrous mat with the intumescent material 337 after intumescence seen from the side of the structural support layer 470 in accordance with some embodiments.

As shown in FIG. 6D and FIG. 6E, the intumescent materials 335, 637 after intumescence completely close the hole in the fibrous mat 530. Thus, intumescent materials 335 and/or 637 may ensure flame containment within the interior volume. In addition, intumescent materials 335, 637 may mitigate uncontrolled heat release from the interior volume through the breach of the battery casing 210.

Figure 7A:
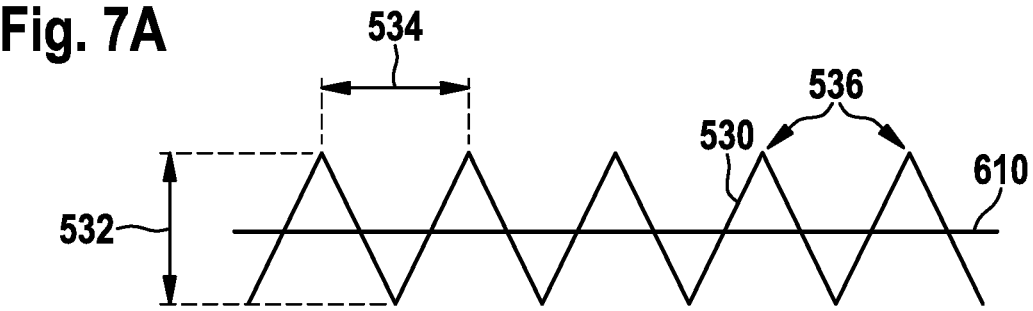
FIG. 7A is a diagram of an illustrative fibrous mat with straight stabilizing means for keeping the fibrous mat evenly distributed in a predetermined arrangement between the structural support layer and the battery casing in accordance with some embodiments.

FIG. 7A is a diagram of an illustrative fibrous mat 530 with straight stabilizing means 610. The stabilizing means 610 may keep the fibrous mat evenly distributed in a predetermined arrangement between a structural support layer and a battery casing (e.g., structural support layer 470 and battery casing 210 of FIG. 6A).

As shown in FIG. 7A, the fibrous mat 530 is shaped in a corrugated way with a predetermined height 532 and a predetermined distance 534 between parallel folding lines 536. The ratio between the predetermined height 532 and the predetermined distance 534 may be between 0.2 and 10. Preferably, the ratio between the predetermined height 532 and the predetermined distance 534 is between 0.5 and 5.

The fibrous mat 530 may be threaded onto the stabilizing means 610. If desired, the fibrous mat 530 may be threaded onto the stabilizing means 610 in a predetermined way. For example, the stabilizing means 610 may traverse each wrinkle of the fibrous mat 530 at the same height as shown in FIG. 7A.

Figure 7B:
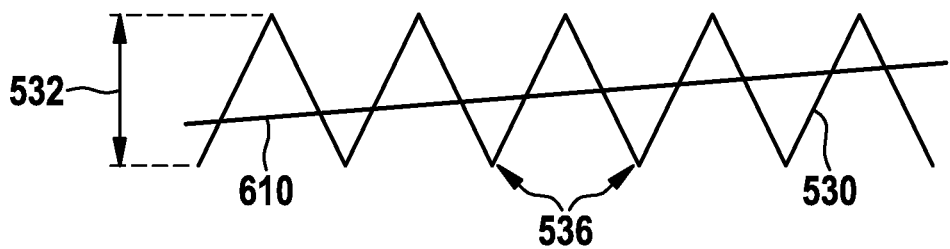
FIG. 7B is another diagram of an illustrative fibrous mat with straight stabilizing means for keeping the fibrous mat evenly distributed in a predetermined arrangement between the structural support layer and the battery casing in accordance with some embodiments.

FIG. 7B is another diagram of an illustrative fibrous mat 530 with straight stabilizing means 610 for keeping the fibrous mat 530 evenly distributed in a predetermined arrangement between a structural support layer and a battery casing (e.g., structural support layer 470 and battery casing 210 of FIG. 6A). As shown in FIG. 7B, the stabilizing means 610 may traverse each wrinkle of the fibrous mat 530 at a different height.

Figure 7C:
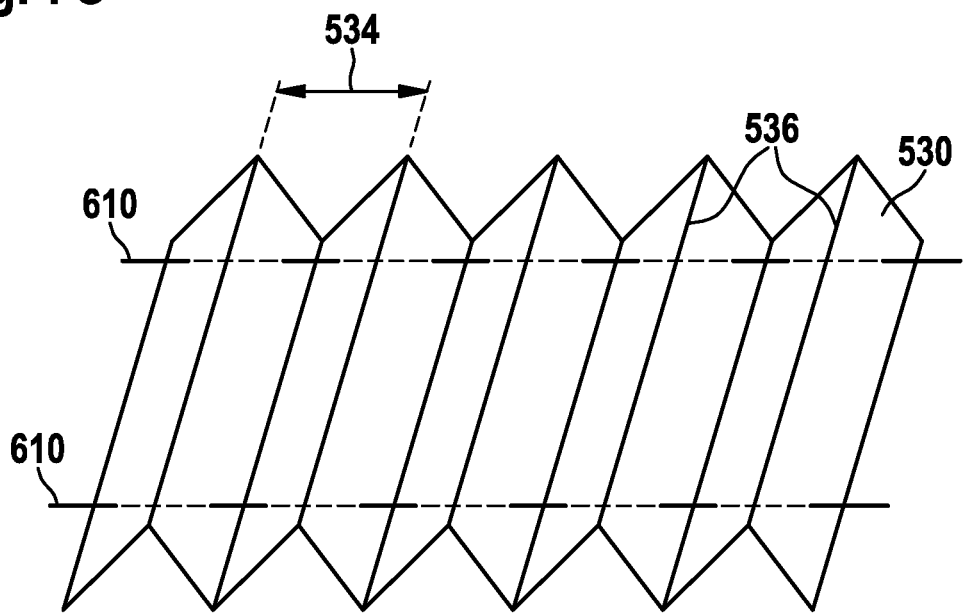
FIG. 7C is a three-dimensional diagram of an illustrative fibrous mat with two parallel straight stabilizing means for keeping the fibrous mat evenly distributed in a predetermined arrangement between the structural support layer and the battery casing in accordance with some embodiments.

FIG. 7C is a three-dimensional diagram of an illustrative fibrous mat 530 with two parallel straight stabilizing means 610 for keeping the fibrous mat 530 evenly distributed in a predetermined arrangement between a structural support layer and a battery casing (e.g., structural support layer 470 and battery casing 210 of FIG. 6A).

The two parallel straight stabilizing means 610 may both traverse each wrinkle of the fibrous mat 530 at the same height. If desired, the two parallel straight stabilizing means 610 may both traverse each wrinkle of the fibrous mat 530 at a different height. Illustratively, a first stabilizing means 610 of the at least two stabilizing means may traverse each wrinkle of the fibrous mat 530 at the same height, while a second stabilizing means 610 of the at least two stabilizing means traverses each wrinkle of the fibrous mat 530 at a different height.

Figure 7D:
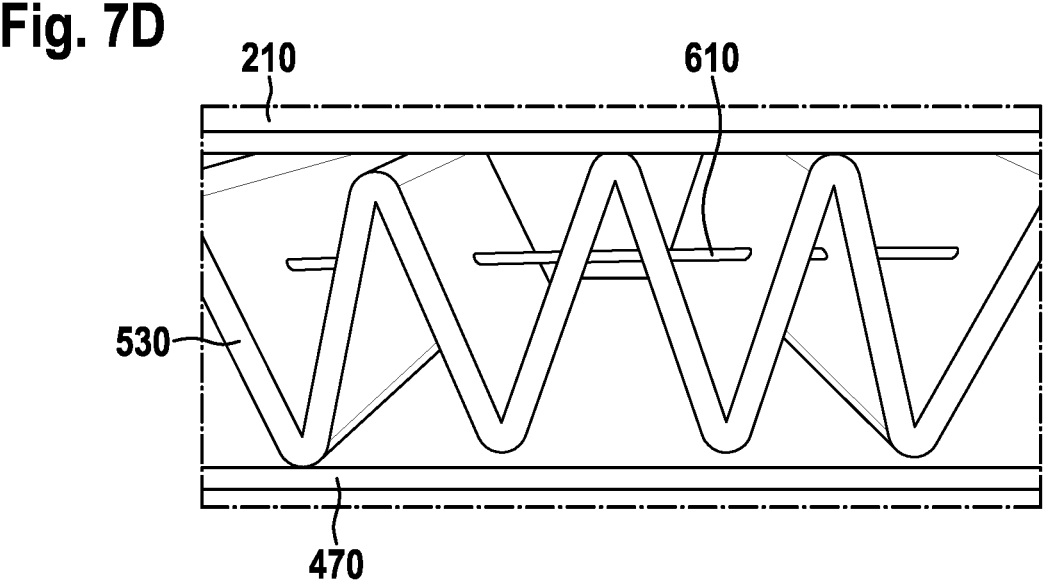
FIG. 7D is a diagram of an illustrative fibrous mat with rounded stabilizing means for keeping the fibrous mat evenly distributed in a predetermined arrangement between the structural support layer and the battery casing in accordance with some embodiments.

FIG. 7D is a diagram of an illustrative fibrous mat 530 with rounded stabilizing means 610 for keeping the fibrous mat 530 evenly distributed in a predetermined arrangement between a structural support layer 470 and a battery casing 210. In other words, the stabilizing means 610 may traverse at least two wrinkles of the fibrous mat 530 at the same height and at least one other wrinkle of the fibrous mat 530 at a different height.

The illustrative approaches of geometrically constraining the fibrous mat 530 before intumescence of the intumescent material shown in FIGS. 7A to 7D may enable the free movement of the fibrous mat 530 in lateral direction upon intumescence of the intumescent material.

During intumescence, the fibrous mat 530 changes its properties and thus also the interaction with the former stabilizing means 610 onto which the fibrous mat 530 was threaded. Due to the softening, expansion, and foaming of the intumescent material during the thermally induced activation reaction, the fibrous mat 530 becomes free to move relative to the stabilizing means 610 in height and in lateral direction as permitted by the structural stabilizing means 470 and the battery casing 210.

Figure 8:
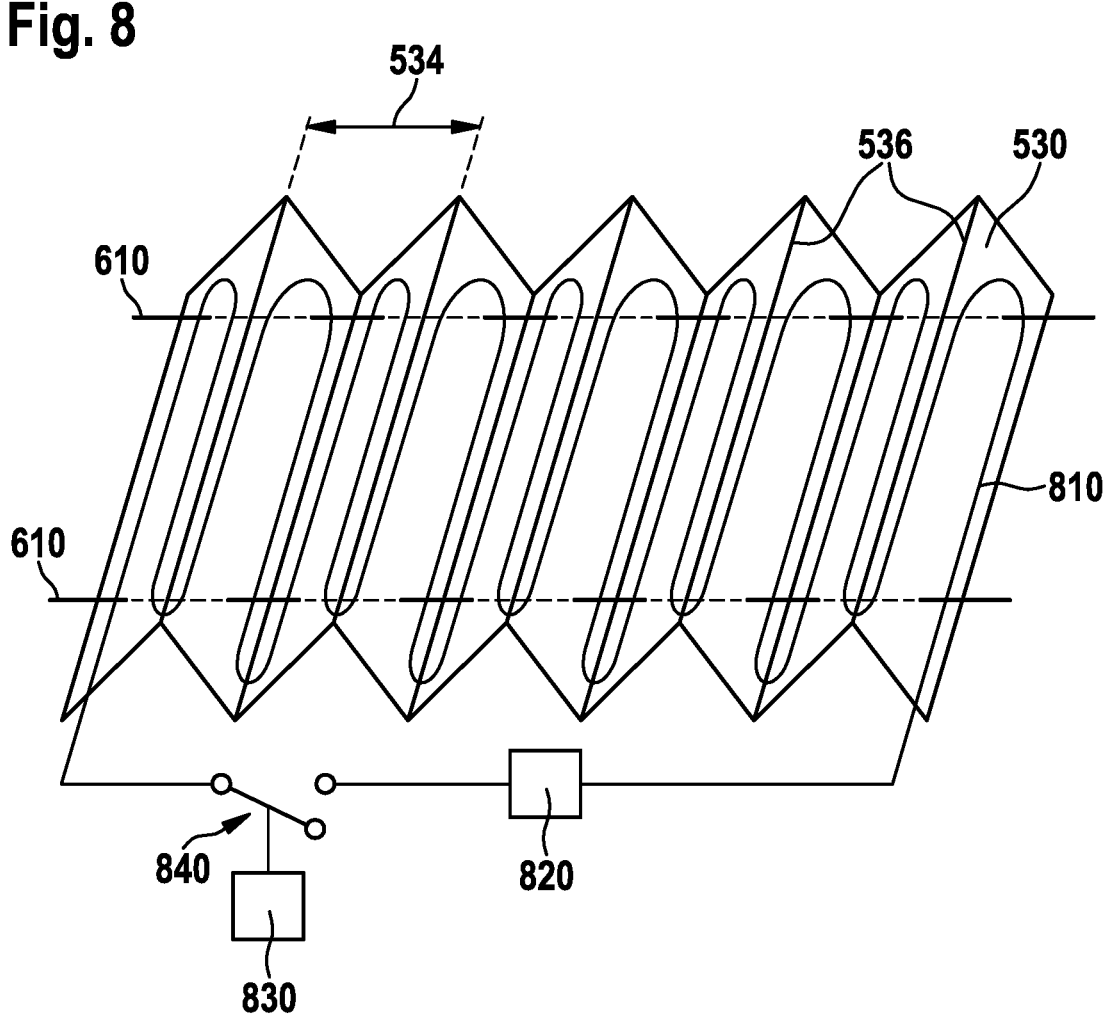
FIG. 8 is a diagram of an illustrative fibrous mat with stabilizing means for keeping the fibrous mat evenly distributed in a predetermined arrangement between the structural support layer and the battery casing and a resistive heating component for activation of the intumescent material that is controlled by a control switch and a temperature sensor in accordance with some embodiments.

FIG. 8 is a diagram of an illustrative fibrous mat 530 with and intumescent material (e.g., intumescent material 335 of FIG. 5A or FIG. 6A) and stabilizing means 610 that form a functional layer between a battery casing and a structural support layer of a battery (e.g., between battery casing 210 and structural support layer 470 of a battery with battery cells 220 in an interior volume 217 as shown in FIGS. 4A to 4E).

The stabilizing means 610 may keep the fibrous mat 530 evenly distributed in a predetermined arrangement between the structural support layer and the battery casing as long as the fibrous mat 530 is exposed to a temperature that is below a predetermined threshold temperature. The predetermined threshold temperature may be the temperature at which the intumescent material intumesces.

By way of example, the fibrous mat 530 may be at least partially shaped in a corrugated way with a predetermined distance 534 between parallel folding lines 536. If desired, the fibrous mat 530 may have a predetermined height between neighboring folding lines 536.

Illustratively, the functional layer may include a resistive heating component 810 for activation of the intumescent material in the fibrous mat 530. The resistive heating component 810 may include metal wires, electrically conducting fibers (e.g., carbon fibers or metal coated fibers), or similar components that produce heat when traversed by an electrical current.

By way of example, the resistive heating component 810 may be electrically connected to a source of electrical energy that provides the electrical current to the resistive heating component 810. As shown in FIG. 8, the source of electrical energy may be a power supply 820 such as a battery. If desired, the power supply 820 may include battery cells that are in an interior volume of the battery (e.g., battery cells 220 in interior volume 217 of FIGS. 4A to 4E).

Illustratively, a control switch 840 may couple the power supply 820 with the resistive heating component 810. The control switch 840 may be controlled by a control circuit 830. If desired, the control circuit 830 may include sensing and monitoring circuitry.

As an example, the sensing and monitoring circuitry may include temperature sensing and monitoring circuitry (e.g., a temperature sensor) to detect overheating, caused for example by a thermal runaway of one or more battery cells in the interior volume of the battery (e.g., battery cells 220 in interior volume 217 of FIGS. 4A to 4E).

As another example, the sensing and monitoring circuitry may include voltage sensing and monitoring circuitry (e.g., a voltmeter) to detect damage, caused for example by an overcharging of one or more battery cells.

As yet another example, the sensing and monitoring circuitry may include current sensing and monitoring circuitry (e.g., an ammeter) to detect damage, caused for example by a short circuit in one or more battery cells.

Illustratively, the control circuit 830 may direct the control switch 840 to remain open for as long as the temperature sensing and monitoring circuitry detects a temperature that is below a predetermined temperature threshold, the voltage sensing and monitoring circuitry detects a voltage that is below a predetermined voltage threshold, and the current sensing and monitoring circuitry detects a current that is below a predetermined current threshold.

Thus, no electrical current flows through the resistive heating component 810 and no heat is produced by the resistive heating component 810 as long as the temperature sensing and monitoring circuitry detects a temperature below the predetermined temperature threshold, the voltage sensing and monitoring circuitry detects a voltage below the predetermined voltage threshold, and the current sensing and monitoring circuitry detects a current below the predetermined current threshold.

As another example, the control circuit 830 may direct closing of the control switch 840 as soon as the temperature sensing and monitoring circuitry detects a temperature that is equal to or above the predetermined temperature threshold, the voltage sensing and monitoring circuitry detects a voltage that is equal to or above the predetermined voltage threshold, or the current sensing and monitoring circuitry detects a current that is equal to or above the predetermined current threshold.

In response to closing the control switch 840, an electrical current may pass through the resistive heating component 810. The electrical current may cause the resistive heating component 810 to generate heat in the fibrous mat 530. The generated heat may lead to the intumescence of the intumescent material.

An actively triggered intumescence of the intumescent material in the fibrous mat 530 caused by the resistive heating component 810 has several advantages over a passively triggered intumescence of the intumescent material in the fibrous mat 530, for example caused by a fire in the interior volume of the battery.

For example, all the intumescent material in the fibrous mat 530 may experience a quasi-instantaneous and simultaneous intumescence when the battery cells in the interior volume are damaged and/or experiencing a potentially hazardous situation.

Moreover, intumescence of the intumescent material may not only depend on the temperature in the interior volume, but may also be triggered in other hazardous situations (e.g., caused by an overcharge or a short-circuit in one or more battery cells).

Furthermore, the expanded char that results from the intumescence of the intumescent material may seal off the battery casing and/or close a breach in the battery casing before the heat and gases that are generated, for example by a thermal runaway of the battery cells, reach a breach in the battery casing.

However, the actively triggered intumescence of the intumescent material may require additional systems and/or functionalities. For example, the additional systems and/or functionalities may include a damage detection device that is integrated in the battery.

If desired, the damage detection device may include the aforementioned temperature, voltage, and/or current sensing and monitoring circuitry. In case of a damage event, the damage detection device may trigger the control circuit 830 such that the control circuit 830 directs a closing of the control switch 840, which may activate the intumescence of the intumescent material by electrical resistive heating.

It should be noted that modifications to the above described embodiments are within the common knowledge of the person skilled in the art and, thus, also considered as being part of the present disclosure.

For example, the fibrous mat 530 of FIG. 7A to FIG. 7D is shown with one or two stabilizing means 610. However, any number of stabilizing means 610 may be used to keep the fibrous mat 530 in place before intumescence of the intumescent material, if desired.

Furthermore, the intumescent material 637 of FIG. 6A is shown to form a coating 639 on the side of the structural support layer 470 that is oriented towards the casing wall 215 or on the inside of the casing wall 215. However, the intumescent material 637 may form a coating instead or in addition on the side of the structural support layer 470 that is oriented towards the interior volume of the battery.

Moreover, the fibrous mat 530 of FIGS. 5A and 6A is shown to be at least partially shaped in a corrugated way between the casing wall 215 and the structural support layer 470. However, the fibrous mat 530 may be arranged between the casing wall 215 and the structural support layer 470 in a sinusoidal way, if desired.

Additionally, the battery 200 of FIG. 2 and FIGS. 3A and 3B has a single gas evacuation venting tube 240. If desired, the battery 200 may have more than one gas evacuation venting tube 240. For example, the battery 200 may have two, three, four, five, six, seven or eight gas evacuation venting tubes.

Furthermore, the fibrous mat 530 of FIGS. 5A to 8 is shown to be shaped in a corrugated way with a predetermined height and a predetermined distance between parallel folding lines. If desired, the predetermined distance between parallel folding lines and the predetermined height may be uniform throughout the entire fibrous mat 530 as illustrated in FIGS. 7A to 8. However, the predetermined distance between parallel folding lines and/or the predetermined height may vary from wrinkle to wrinkle of the fibrous mat 530 as shown for some wrinkles of the fibrous mat 530 of FIG. 5A.

REFERENCE LIST 100 aircraft
101*a* multi-blade main rotor
101*b*, 101*c* rotor blades
101*d* rotor head
102 aircraft airframe, fuselage
102*a* cockpit
102*b* cabin
103 tail boom
104 counter-torque device
104*a* tail rotor
105 fin
106 aircraft upper deck
106*a* engine deck
107 engine accommodating region
108 cowling
200 battery
210 battery casing
215 casing wall
217 interior volume
220 battery cells
240 gas evacuation venting tube
330 functional layer
335 intumescent material
337 expanded char
340 breach
350 controlled heat and gas release
352 uncontrolled heat and gas emission
355 plug
360 thermal runaway
420 ballistic threat, bullet
470 structural support layer
530 fibrous mat
532 height
534 distance
536 parallel folding lines
610 stabilizing means
637 intumescent material
639 coating
810 resistive heating component
820 power supply
830 control circuit
840 controlled switch

What is claimed is:

1. A battery for an aircraft, comprising:
a battery casing with a casing wall that forms an interior volume;
a plurality of battery cells that is arranged in the interior volume; and
a functional layer that is arranged at the casing wall between the plurality of battery cells and the battery casing, wherein the functional layer comprises an intumescent material that, in case of a breach of the battery casing, is adapted to ensuring flame containment within the interior volume and mitigation of uncontrolled heat and gas emission from the interior volume through the breach of the battery casing; and
a structural support layer that encloses the plurality of battery cells and separates the plurality of battery cells from the functional layer,
wherein the functional layer further comprises:
a fibrous mat that comprises the intumescent material, wherein the fibrous mat remains evenly distributed in a predetermined arrangement between the structural support layer and the casing wall in case of an exposure to a temperature that is below a predetermined threshold, and wherein the fibrous mat is free to move between the structural support layer and the casing wall in case of an exposure to a temperature that is equal to or above the predetermined threshold.

2. The battery of claim 1 wherein the plurality of battery cells comprises at least one of lithium-ion, sodium ion, or magnesium ion battery cells.

3. The battery of claim 1 further comprising:
a gas evacuation venting tube adapted to enable a controlled evacuation of gases in case of a thermal runaway of at least a portion of the plurality of battery cells.

4. The battery of claim 1 wherein the functional layer increases in volume upon intumescence of the intumescent material by at least a factor of 3.

5. The battery of claim 1 wherein the fibrous mat comprises at least one of mineral wool, glass fibers, mineral fibers, alkaline earth silica fibers, carbon fibers, basalt fibers, binder, methylol melamine, phenol-formaldehyde resin, epoxy resin, pentaerythritol, monomer, dimer, trimer, starch, dextrin, sorbitol, mannitol, expandable graphite, exfoliating graphite, or char former polymer.

6. The battery of claim 1 wherein the fibrous mat is at least partially shaped in a corrugated way with a predetermined height and a predetermined distance between parallel folding lines.

7. The battery of claim 6 wherein a ratio between the predetermined height and the predetermined distance is between 0.5 and 5.

8. The battery of claim 6 wherein the fibrous mat is superficially cut along ridges of the parallel folding lines.

9. The battery of claim 6 wherein the functional layer further comprises:
stabilizing means for keeping the fibrous mat evenly distributed in the predetermined arrangement between the structural support layer and the casing wall in case of the exposure to the temperature that is below the predetermined threshold.

10. The battery of claim 9 wherein the stabilizing means comprise at least one of pins, rods, or wires.

11. The battery of claim 10 wherein the fibrous mat is threaded onto the at least one of pins, rods, or wires.

12. The battery of claim 1 wherein the functional layer further comprises:
an additional intumescent material that forms a coating on the casing wall.

13. An aircraft with a battery comprising:
a battery casing with a casing wall that forms an interior volume;
a plurality of battery cells that is arranged in the interior volume; and
a functional layer that is arranged at the casing wall between the plurality of battery cells and the battery casing, wherein the functional layer comprises an intumescent material that, in case of a breach of the battery casing, is adapted to ensuring flame containment within the interior volume and mitigation of uncontrolled heat and gas emission from the interior volume through the breach of the battery casing; and
a structural support layer that encloses the plurality of battery cells and separates the plurality of battery cells from the functional layer,
wherein the functional layer further comprises:
a fibrous mat that comprises the intumescent material, wherein the fibrous mat remains evenly distributed in a predetermined arrangement between the structural support layer and the casing wall in case of an exposure to a temperature that is below a predetermined threshold, and wherein the fibrous mat is free to move between the structural support layer and the casing wall in case of an exposure to a temperature that is equal to or above the predetermined threshold.

14. The aircraft of claim 13, wherein the plurality of battery cells comprises at least one of lithium-ion, sodium-ion, or magnesium-ion battery cells.

15. The aircraft of claim 13, wherein the battery further comprises:
a gas evacuation venting tube adapted to enable a controlled evacuation of gases in case of a thermal runaway of at least a portion of the plurality of battery cells.

16. The aircraft of claim 13, wherein the functional layer increases in volume upon intumescence of the intumescent material by at least a factor of 3.

17. The aircraft of claim 13, wherein the fibrous mat comprises at least one of mineral wool, glass fibers, mineral fibers, alkaline earth silica fibers, carbon fibers, basalt fibers, binder, methylol melamine, phenol-formaldehyde resin, epoxy resin, pentaerythritol, monomer, dimer, trimer, starch, dextrin, sorbitol, mannitol, expandable graphite, exfoliating graphite, or char former polymer.

18. The aircraft of claim 13, wherein the fibrous mat is at least partially shaped in a corrugated way with a predetermined height and a predetermined distance between parallel folding lines.

19. The aircraft of claim 18, wherein a ratio between the predetermined height and the predetermined distance is between 0.5 and 5.

20. The aircraft of claim 18, wherein the fibrous mat is superficially cut along ridges of the parallel folding lines.

* * * * *